April 1, 1952 E. R. MUNDY ET AL 2,591,279
COLLAPSIBLE MAP AND SCHEDULE DISPLAY DEVICE
Filed Dec. 14, 1948

Edward R. Mundy
Arthur L. Mundy
INVENTORS

BY *[signatures]*
Attorneys

UNITED STATES PATENT OFFICE 2,591,279

COLLAPSIBLE MAP AND SCHEDULE DISPLAY DEVICE

Edward R. Mundy, Ephrata, Wash., and Arthur L. Mundy, Ben Hill, Ga.

Application December 14, 1948, Serial No. 65,114

3 Claims. (Cl. 40—65)

This invention relates generally to a collapsible map and schedule display device comprising sections telescopically arranged to collapse within a container and to extend from an open end of the container so that maps in sections and schedules in sections related to the map sections can be selectively displayed.

A primary object of this invention is to provide a collapsible map and schedule display device adapted to be used by travellers, the maps and schedules being sectionally displayed, so that for any given degree of extension of a section or sections of the device a map of a certain locality and data such as times of arrival and departure of conveyances for that particular locality may be easily read.

Another object of this invention is to provide a device of the character mentioned above in which the edges of the container for the device and the more inwardly disposed section or sections serve as datum lines to facilitate the reading of the corresponding portions of a map and schedule.

Still another object of this invention, directly related to the collapsible nature of the device, is to provide a map and schedule display which is small enough to be easily carried in a pocketbook or pocket in a garment.

Still another object of this invention is to provide a device which is ideally adapted for use as an advertising medium.

Another object of this invention, related to all the preceding objects, is to provide a device which can be adapted for uses other than the display of maps and time tables as, for example, facts relating to the time and place of meetings of an organization, and the like.

And a last object to be mentioned specifically is to provide a device of the character mentioned which is relatively inexpensive and practicable to manufacture, which is simple and extremely convenient to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 may be considered a front elevational view of the device in partially extended position;

Similar characters of reference designate similar or identical elements and portions throughout the specification and throughout the different views in the drawings.

Figure 1:
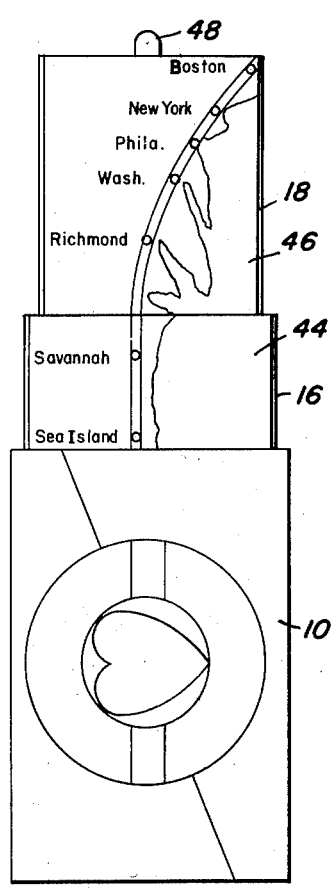
Figure 2:
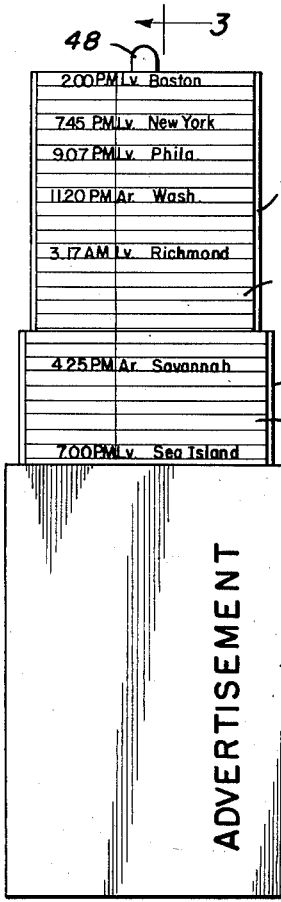
Figure 2 is a rear elevational view of the device similarly partially extended.
Figure 3:
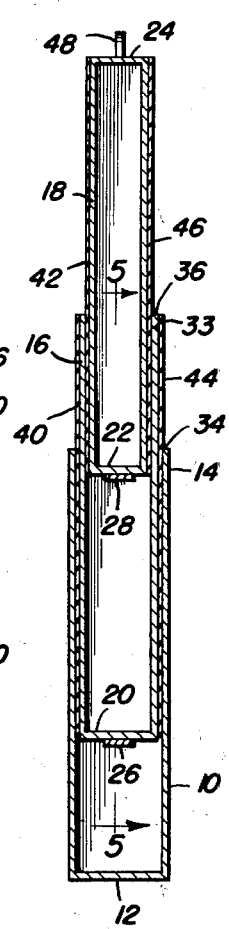
Figure 3 is a vertical sectional view, taken substantially on the line 3—3 in Figure 2.
Figure 4:
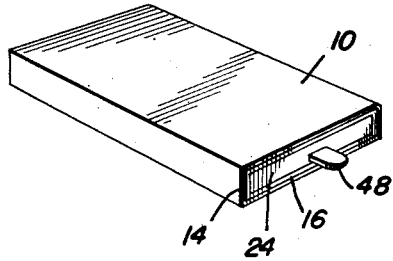
Figure 4 is a three dimensional view of the device in collapsed position.
Figure 5:
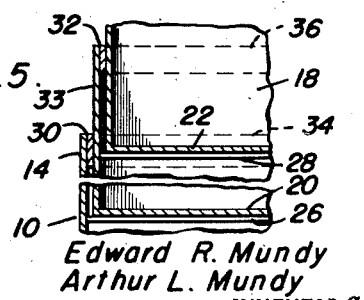
Figure 5 is another vertical sectional view, taken on the line 5—5 in Figure 3.

Referring now to the drawing in detail, this invention includes a container which may be fabricated from paper, commercial plastic, or the like, and which will preferably be a hollow rectangular box-like member as illustrated in the drawing, with one end of this container 10 closed as indicated at 12 and the opposite end 14 open.

Sections, represented in the drawing as being two in number, are telescopically arranged within themselves, as indicated at 16 and 18 and also telescopically associated with the container 10. These sections will be of a similar general shape to fit snugly and to extend through the open end 14 of the container when manually pulled out by the user of the device. The inner section 16 will be closed at its inner end 20, while the outer section 18 will be closed at both inner end 22 and outer end 24. Elongated straps 26 and 28 will be secured longitudinally on the ends 20 and 22 of the sections and these straps will extend beyond the side edges of the respective sections to engage stops 30 and 32 fixed adhesively or otherwise interiorly of the open ends 14 and 33 of the container and the section 16, respectively, so that the sections will be prevented from being completely withdrawn. The edges 34 and 36 at these open ends 14 and 33 will serve as datum lines to facilitate the reading of printed schedules or other sheets of like nature indicated at 40 and 42 as applied adhesively on one pair of wide faces of the sections 16 and 18, respectively. The edges 34 and 36 also serve as datum lines to facilitate the reading of sheets adhesively secured to the opposite wide faces of the sections 16 and 18, exemplified in Figure 1 as comprising strip maps 44 and 46. It will be understood that the sheets 40 and 42, when comprising schedules will ordinarily bear a cogitive relationship, as will the strip maps 44 and 46, this relationship being ordinarily simply the continuation of one schedule onto another and the well known relationship of consecutive strip maps. It should also be noted that the sheets on the opposite sides of one particular section will have a definite relationship in most practical applications of this invention. For example, the time schedule indicated in the sheet 40 will refer to geographical information given by the strip map 44, and the schedule or sheet 42 will refer to the strip map 46. To facilitate the manual extensions of the sections, the outer section 18 may be provided with a tab 48.

Advertising matter may be applied to any or all of the portions of this device not covered by the strip maps and schedules.

The operation of this invention will be clearly understood from a consideration of the foregoing description of the mechanical details thereof, taken in connection with the drawing and with the above recitation of the objects sought to be achieved by this invention.

Obviously minor variations from the embodiment described may be resorted to without departure from the spirit of this invention and this invention should be limited only by a proper interpretation of the subjoined claims.

Having described the invention, what is claimed as new is:

1. A collapsible map and schedule display device comprising a hollow container having one end closed and the opposite end open, hollow sections of the same general shape as said containers and telescopically arranged to collapse within said container and to extend from the open end thereof, sheets adhesively secured on adjacent sides of said sections, and other sheets adhesively secured on the opposite sides of said sections, the first mentioned sheets being strip maps, and the second mentioned sheets being schedules corresponding with said strip maps, stops secured interiorly of said container at said open end, and an elongated strap secured to the inner end of the section adjacent the container and engaging said stops to prevent complete withdrawal of the section adjacent the container.

2. A collapsible map and schedule display device comprising a hollow container having one end closed and the opposite end open, hollow sections of the same general shape as said container and telescopically arranged to collapse within said container and to extend from the open end thereof, sheets adhesively secured on adjacent sides of said sections, and other sheets adhesively secured on the opposite sides of said sections, the first mentioned sheets being strip maps, and the second mentioned sheets being schedules corresponding with said strip maps, said container and sections being non-circular in cross section whereby rotation of the sections relative to each other and to said container is prevented, and stop means to prevent complete withdrawal of the sections.

3. A collapsible map and schedule display device comprising a hollow container having one end closed and the opposite end open, hollow sections of the same general shape as said container and telescopically arranged to collapse within said container and to extend from the open end thereof, sheets adhesively secured on adjacent sides of said sections, and other sheets adhesively secured on the opposite sides of said sections, the first mentioned sheets being strip maps, and the second mentioned sheets being schedules corresponding with said strip maps, said container and sections being non-circular in cross section whereby rotation of the sections relative to each other and to said container is prevented, the edges of the container at said open end and the corresponding edges of certain of said sections comprising datum lines facilitating the reading of corresponding portions of said map and schedule, and stop means to prevent complete withdrawal of the sections.

EDWARD R. MUNDY.
ARTHUR L. MUNDY.

REFERENCES CITED

The following references are of record in the file of this patent:

UNITED STATES PATENTS

| Number | Name | Date |
| --- | --- | --- |
| 1,039,322 | Rindall | Sept. 24, 1912 |
| 1,112,147 | Levie | Sept. 29, 1914 |
| 1,596,118 | Plume | Aug. 17, 1926 |
| 1,596,936 | Mengden | Aug. 24, 1926 |
| 1,809,211 | McMaster | June 9, 1931 |
| 2,401,478 | Grossman | June 4, 1946 |

FOREIGN PATENTS

| Number | Country | Date |
| --- | --- | --- |
| 427,830 | Germany | Apr. 19, 1926 |